United States Patent
Kedem

(10) Patent No.: US 6,567,888 B2
(45) Date of Patent: *May 20, 2003

(54) METHOD AND APPARATUS FOR EFFICIENTLY DESTAGING DATA FROM A CACHE TO TWO OR MORE NON-CONTIGUOUS STORAGE LOCATIONS

(75) Inventor: Ishay Kedem, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/245,895

(22) Filed: Sep. 17, 2002

(65) Prior Publication Data

US 2003/0028724 A1 Feb. 6, 2003

Related U.S. Application Data

(63) Continuation of application No. 09/107,792, filed on Jun. 30, 1998, now Pat. No. 6,484,234.

(51) Int. Cl.[7] .......................... G06F 12/00; G06F 13/00
(52) U.S. Cl. ....................... 711/113; 711/135
(58) Field of Search ............................... 711/112, 113, 711/118, 135, 136

(56) References Cited

U.S. PATENT DOCUMENTS

| | | | | |
|---|---|---|---|---|
| 5,715,424 A | * | 2/1998 | Jesionowski et al. | 714/24 |
| 5,734,861 A | * | 3/1998 | Cohn et al. | 711/134 |
| 5,761,166 A | * | 6/1998 | Sedlmayr et al. | 360/69 |
| 5,765,193 A | * | 6/1998 | Rosich et al. | 711/136 |
| 5,829,018 A | * | 10/1998 | Moertl et al. | 711/113 |

* cited by examiner

Primary Examiner—Reginald G. Bragdon
Assistant Examiner—Pierre M. Vital
(74) Attorney, Agent, or Firm—Wolf, Greenfield & Sacks, P.C.

(57) ABSTRACT

In one embodiment of the invention, during a single I/O operation, data is destaged from a cache to at least two non-contiguous storage locations of a data storage device without overwriting at least one storage location disposed between the at least two non-contiguous storage locations. In another embodiment, a communication link is established between a controller that controls data flow between a cache and a data storage device, and this communication link is used to destage data from the cache to at least two non-contiguous storage locations of the data storage device without overwriting at least one storage location between the at least two non-contiguous storage locations and without breaking the communication link. In another embodiment of the invention, data is destaged from a cache to a data storage device by transmitting the data to the data storage device, and also transmitting information to the data storage device identifying at least two storage locations to which the data is to be written, and further identifying at least one storage location, disposed between the at least two storage locations, to which the data is not to be written.

21 Claims, 8 Drawing Sheets

METHOD AND APPARATUS FOR EFFICIENTLY DESTAGING DATA FROM A CACHE TO TWO OR MORE NON-CONTIGUOUS STORAGE LOCATIONS

CROSS-REFERENCE TO RELATED APPLICATION

This application is a continuing application which claims the benefit under 35 U.S.C. §120 of application Ser. No. 09/107,792, filed Jun. 30, 1998, which is hereby incorporated by reference, now U.S. Pat. No. 6,484,234.

BACKGROUND OF THE INVENTION

1. Field of the Invention

The present invention is directed to cached data storage systems.

2. Description of Related Art

Storage systems including storage devices such as disk drives, tape drives, etc., are used in many different types of computer or data processing systems to store data. Disk drives generally include one or more disks of a recording medium (e.g., a magnetic recording medium or an optical recording medium) on which information can be written for storage purposes, and from which stored information can be read. Large data storage systems may include on the order of one-hundred disk drives, with each disk drive including several disks. One such mass storage system is the SYMMETRIX line of disk arrays available from EMC Corporation of Hopkinton, Mass. The SYMMETRIX line of disk arrays is described in numerous publications from EMC Corporation, including the SYMMETRIX model 55XX product manual, P-N200-810-550, rev. F, February 1996.

In a data storage system, a host data processor typically is able to write data to and read data from particular storage locations in one or more of the data storage devices. To increase system performance, a cache may be interposed between the host data processor and the data storage device (s). In a cached system, when the host data processor writes data to a storage device, the data is stored temporarily in the cache before being destaged to the storage device in a manner that is asynchronous with and transparent to the host. Once the host data processor has written data to the cache, the host data processor can perform other tasks while the data storage system destages the data from the cache to the appropriate storage device(s). Because the host data processor can write data to the cache much faster than to the data storage devices, caching the data increases the data transfer efficiency of the system.

Similarly, in a cached system, when the host data processor reads data from a data storage device, it may actually read the data from the cache after the data has been transferred from the data storage device to the cache. When the host data processor requests a read from a data storage device, if the data is already in the cache, the host data processor can read the data immediately from the cache, increasing the performance of the system in performing such a read. When the data is not already in the cache, the data may first be transferred from the data storage device to the cache before the host data processor reads the data from cache.

Data commonly is stored in a data storage system in units called "logical volumes," and these logical volumes typically are divided into so-called "logical blocks." Accordingly, the host data processor accesses data in the storage system using a logical volume address (LVA) and a logical block address (LBA). In some intelligent storage systems, a mapping is performed between the LVA's provided by the host and the actual physical locations where the corresponding data is stored. Thus, in such intelligent systems, the actual physical locations at which the logical blocks and logical volumes of data are stored in the data storage devices generally are not visible to the host data processor. That is, the host data processor needs only to specify LVAs and LBAs, and the data storage system controls how the logical volumes of data are mapped to and stored by the data storage devices. Each physical storage device (e.g., a disk drive) in the storage system may store a single logical volume. Alternatively, it is possible in many systems to configure each physical storage device to store two or more logical volumes, or to configure two or more storage devices to store a single logical volume.

FIG. 1. shows an exemplary prior art data storage system 101. As shown, the data storage system 101 includes data flow controllers 104a–b, data storage devices 106a–h, and a memory 102 that is globally accessible to the data flow controllers. The globally accessible memory 102 includes a cache 116 and a directory 108. Each of the data flow controllers 104a–b includes a direct memory access (DMA) machine, a bus interface device, and a processor (e.g., the DMA machine 109, the bus interface device 111, and the processor 107 shown in the data flow controller 104a). Each of the data storage devices 106a–h includes several storage locations (e.g., storage locations 110, 112, and 114 shown in the data storage device 106a). It should be understood that each data storage device 106 typically includes many more storage locations than are shown in FIG. 1. A data storage system such as that shown in FIG. 1 also typically includes many additional data storage devices and data flow controllers to permit large quantities of data to be stored by the system.

Using the exemplary storage system shown in FIG. 1, a host data processor (not shown) can write data to and read data from the data storage devices 106a–h via the cache 116 and the data flow controllers 104a–b. Using buses 103 and 105a–b, the data flow controllers 104a–b can direct the transfer of data between the cache 116 and storage locations (e.g., the storage locations 110, 112 and 114) in the data storage devices 106a–h.

Data can be transferred between the cache 116 and the data storage devices 106a–h in units of any size. Commonly, however, data is transferred between these devices in logical blocks. A logical block may include, for example, five hundred and twelve bytes of data. Typically, the cache 116 is divided into a number of units called "slots" (not shown), with each slot being divided into several sections. Each section of a slot typically will have storage space for a single logical block of data and will therefore be referred to herein as a block-sized section. Each slot may be divided into a sufficient number of sections to provide storage space for a logical track of data, which may, for example, correspond to the amount of storage space provided by a physical track of disk a drive serving as one of the data storage devices 106a–h. Each slot may, for example, be divided into one hundred and twelve block-sized sections to create storage space for a logical track of data that is one hundred and twelve logical blocks long. Each logical volume stored by the system typically is divided into several logical cylinders, with each logical cylinder being divided into several logical tracks. Each logical cylinder may, for example, correspond to a physical cylinder (described below) of a disk drive serving as one of the data storage devices 106a–h. Before a logical block of data is written to the cache 116, a slot can be dynamically assigned to represent the logical track in which the logical block of data is included, and the logical block can be written to a block-sized section of the slot corresponding to the logical block's location within the logical track.

Each slot in the cache 116 may have a holder associated with it which contains information regarding the current contents of the slot. For example, the holder may contain information identifying: (1) the logical track that the slot is currently assigned to represent, and (2) the particular block-sized section(s) within the slot that contain logical blocks of data that have been written by the host data processor but that have not yet been destaged to one or more of the data storage devices 106a–h, i.e., those block-sized sections that currently contain logical blocks of write-pending data.

The directory 108 may contain a write-pending flag for each logical track of data stored by the system. For a write operation, after the host data processor (not shown) has transferred a logical block of data to a block-sized section of a slot of the cache 116, the write-pending flag for the logical track that includes that logical block of data can be set in the directory 108 to indicate that data for the logical track is currently stored in the cache 116 and has yet to be destaged to the data storage device 106. The processor in each data flow controller 104 (e.g., the processor 107) can periodically scan the directory 108 for write-pending flags that have been set for logical tracks that are stored by the storage devices 106 serviced by the data flow controller 104. In response to identifying a set write-pending flag for a particular logical track, the processor 107, by examining the holders of the various slots, can identify the slot(s) currently assigned to store those logical block(s) of the logical track that include write-pending data. Additionally, by examining the contents of the holder associated with the identified slot, the processor 107 can identify which block-sized sections of the slot store logical blocks of write-pending data.

Since the holder for each slot identifies the slot as storing data for a logical track including logical blocks of data (e.g., one hundred and twelve logical blocks) having sequential LBAs, each logical block of data that is written to a slot is stored in the slot according to its LBA. However, when each block of data is stored in one of the data storage devices 106a–h, it is stored according to a physical block address (PBA) which uniquely identifies the physical location in the data storage device at which the block of data is stored. Each LBA of a logical volume may be mapped (by one of the data flow controllers 104a–b) to any PBA(s) of the data storage devices 106a–h, so long as: (1) each LBA is mapped to at least one PBA, and (2) no two LBAs are mapped to the same PBA of the same data storage device.

The cache 116 does not have sufficient storage capacity to store all of the information stored by the data storage devices 106a–h. Once the cache 116 is full, if data included in a logical track for which a cache slot is not currently assigned is to be written to the cache 116, then one of the currently-assigned cache slots needs to be reassigned to store the data for the new logical track. When a slot containing write-pending data is to be reassigned to another logical track, the write-pending data is first destaged to the appropriate storage device(s) 106 to ensure that the data is not lost.

To destage a single block of write-pending data from the cache 116 to the data storage device 106a, the processor 107 programs the DMA machine 109 to access the block-sized section of the cache 116 at which the block of write-pending data is stored, and the DMA machine 109 reads this block of data and makes it available to the bus interface device 111.

The processor 107 also provides the bus interface device 111 with the PBA to which the block of data should be written, and instructs the bus interface device 111 to begin an input/output (I/O) operation to destage the block of data to the data storage device 106a. During the I/O operation, the bus interface device 111 provides information to the data storage device 106a indicating the PBA at which the block of data is to be stored, and transfers the block of write-pending data from the DMA machine 109 to the data storage device 106a.

Storage locations in data storage devices 106a–h that have consecutive PBAs are considered to be "contiguous" storage locations, regardless of the physical arrangement of the storage medium on which the storage locations are disposed. Non-contiguous storage locations in data storage devices 106a–h do not have consecutive PBAs. For example, if the storage locations 110, 112 and 114 of data storage device 106a have PBAs of one, two and three, respectively, then the storage locations 110 and 112 are contiguous, storage locations 112 and 114 are contiguous, and storage locations 110 and 114 are non-contiguous.

In the system shown in FIG. 1, when the data flow controller 104a detects that several blocks of data are to be destaged from the cache 116 to contiguous storage locations of the data storage device 106a, the data flow controller 104a may destage these blocks by initiating a single (I/O) operation. To accomplish this result, the bus interface device 111 indicates to the data storage device 106a: (1) the PBA at which the data storage device 106a should begin storing the several blocks of data, and (2) the total number of blocks of data that will be transferred during the I/O operation. When the SCSI architecture is used to implement the bus 105a, the bus interface device 111 can communicate this information to the data storage device 106a by transmitting a WRITE command (e.g., SCSI operational code "2A") to the storage device 106a.

For example, if the storage locations 110, 112 and 114 have PBAs of one, two and three, respectively, then the data flow controller 104a may transfer three blocks of data from the cache 116 to the storage locations 110, 112 and 114 during a single I/O operation, as follows. First, the processor 107 can program the DMA machine 109 to make the three blocks of data available (in the proper sequence) to the bus interface device 111. Next, the processor 107 can cause the bus interface device 111 to communicate to the data storage device 106a (e.g., by issuing a WRITE command) that the first block of data being destaged is to be written to the storage location 110, and that a total of three blocks of data will be destaged during the I/O process. Finally, the processor 107 can cause the bus interface device 111 to transfer (in sequence) the three blocks of data to the data storage device 106a.

In existing systems, such as that shown in FIG. 1, there are two known methods for destaging data from the cache 116 to non-contiguous groups of storage locations (wherein each group includes one or more contiguous storage locations) in a data storage device 106. Valid data may exist in the storage locations between the non-contiguous groups of storage locations to which data is to be destaged. Each of the known methods ensures that these intermediate storage locations are not overwritten with invalid data. A description of each of these two methods follows as it might be employed by the data flow controller 104a to destage data from the cache 116 to non-contiguous groups of storage locations of the data storage device 106a via a SCSI bus.

According to one of the two known methods, the data flow controller 104a performs a separate search of the directory 108 and initiates a separate SCSI I/O process to destage data to each of several non-contiguous groups of storage locations. Multiple searches of the directory 108 and multiple I/O processes therefore are required to destage the data according to this method. Because the directory 108 can include write-pending flags for a very large number of logical tracks of data (e.g., "61,440" logical tracks per logical volume), this multiple searching can be quite time-consuming. Also, the data flow controller 104*a* typically must arbitrate for and gain control of the bus 105*a* prior to performing each I/O process. Therefore, the time taken to destage data to "n" non-contiguous groups of storage locations includes: (1) the time taken to perform "n" searches of the directory 108, (2) the time taken to arbitrate for the bus "n" times, and (3) the time taken to perform "n" I/O processes that each transfers data (via the bus 105*a*) to one group of contiguous storage locations of the data storage device 106*a*.

To address the performance problems with the above-discussed method of destaging non-contiguous blocks of data, a second method has been developed. The second method involves only a single search of the directory 108, but still requires that the data flow controller 104*a* arbitrate twice for the bus, and requires two I/O processes to perform the destaging. According to this second known method, the data flow controller 104*a* first scans the directory 108 and identifies one or more write-pending flags for logical track (s) of data. Next, by scanning the cache slot holders (not shown) in the cache 116, the data flow controller 104*a* identifies the block-sized sections of one or more slots of the cache 116 at which blocks of write-pending data are stored.

The data flow controller 104*a* next causes the bus interface device 111 to arbitrate for the bus 105*a* to establish a first connection with the data storage device 106*a*, and to initiate a first I/O process during which blocks of data are read (via the bus interface device 111 and the DMA machine 109) from storage locations between the non-contiguous groups of storage locations in the data storage device 106*a*. The data is read to the slot(s) in the cache 116 in which the write-pending data is stored. Thus, any valid data that is present in the intermediate storage locations between the non-contiguous groups of storage locations is transferred to the block-sized sections of the cache slot(s) between the block-sized sections in which the write-pending data is stored.

The reading of data from these intermediate storage locations to the cache 116 can be accomplished by: (1) reading data from a single group of contiguous storage locations which includes the intermediate locations, as well as the storage locations for which write-pending data exists in the cache 116, and (2) writing only the data read from the intermediate storage locations to the cache 116 so that the write-pending data is not overwritten.

After the first I/O process has completed, the data flow controller 104*a* causes the bus interface device 111 to arbitrate a second time for control of the bus 105*a* to establish a second connection with the data storage device 106*a*. Once control of the bus is obtained, the data flow controller 104*a* initiates a second I/O process during which several blocks of data are destaged from the cache slot(s) in which the write-pending data is stored to a single group of contiguous storage locations in the data storage device 106*a*. This group of contiguous storage locations includes not only those non-contiguous storage locations for which write-pending data originally existed in the cache 116, but also the storage locations disposed between them.

The time taken to destage data to "n" non-contiguous groups of storage locations according to this second method therefore includes: (1) the time taken to perform a single search of the directory 108, (2) the time taken to twice arbitrate for and gain control of the bus 105*a*, and (3) the time taken to perform two separate I/O processes, i.e., the first I/O process to read the data from the storage locations between the non-contiguous groups of storage locations, and the second I/O process to destage the data from the cache 116 to the single group of contiguous storage locations.

What is needed, therefore, is an improved method and apparatus for destaging data from a cache to two or more non-contiguous storage locations.

SUMMARY OF THE INVENTION

According to one aspect of the present invention, a method is disclosed for destaging data from a cache to at least one data storage device in a data storage system having a controller that controls data flow between the cache and the at least one data storage device. The method includes a step of: (a) during a single I/O operation between the controller and the at least one data storage device, destaging data from the cache to at least two non-contiguous storage locations of the at least one data storage device without overwriting at least one storage location disposed between the at least two non-contiguous storage locations.

According to another aspect of the invention, a method is disclosed for destaging data from a cache to at least one data storage device in a data storage system having a controller that controls data flow between the cache and the at least one data storage device via a bus that is shared by at least one system component in addition to the controller and the at least one data storage device. The method includes steps of: (a) establishing a communication link between the controller and the at least one data storage device via the bus; and (b) using the communication link established in step (a) to destage data over the bus from the cache to at least two non-contiguous storage locations of the at least one data storage device without overwriting at least one storage location between the at least two non-contiguous storage locations and without breaking the communication link.

According to another aspect of the invention, a method is disclosed for destaging data from a cache to at least one data storage device in a data storage system, wherein the at least one data storage device includes a plurality of storage locations. The method includes steps of: (a) transmitting the data from the cache to the at least one data storage device; and (b) transmitting information to the at least one data storage device identifying at least two storage locations of the at least one data storage device to which the data is to be written, and further identifying at least one storage location, disposed between the at least two storage locations, to which the data is not to be written.

According to another aspect of the present invention, a data storage system includes: a cache; at least one data storage device including a plurality of storage locations; at least one communication link coupled between the cache and the at least one data storage device; and means for destaging data from the cache to at least two non-contiguous storage locations of the at least one data storage device during a single I/O operation over the at least one communication link without overwriting at least one storage location disposed between the at least two non-contiguous storage locations.

According to another aspect of the invention, a data storage system includes: a cache; at least one data storage device including a plurality of storage locations; at least one communication link coupled between the cache and the at least one data storage device; means, using the at least one communication link, for transmitting the data from the cache to the at least one data storage device; and means, using the at least one communication link, for transmitting information to the at least one data storage device identifying at least two storage locations of the at least one data storage device to which the data is to be written, and further identifying at least one storage location disposed between the at least two storage locations to which the data is not to be written.

According to yet another aspect of the invention, a data storage system includes: a cache; at least one data storage device; and a data flow controller, coupled between the cache and the at least one data storage device, configured to destage data from the cache to at least two non-contiguous storage locations of the at least one data storage device during a single I/O operation without overwriting at least one storage location disposed between the at least two non-contiguous storage locations.

According to another aspect of the invention, a data storage system includes: a cache; at least one data storage device including a plurality of storage locations; at least one communication link coupled between the cache and the at least one data storage device; and a data flow controller, coupled between the cache and the at least one data storage device, to destage data from the cache to the at least one data storage device and to transmit information to the at least one data storage device identifying at least two of the plurality of storage locations to which the data is to be written, and further identifying at least one of the plurality of storage locations disposed between the at least two of the plurality of storage locations to which the data is not to be written.

DETAILED DESCRIPTION OF THE INVENTION

Figure 1:
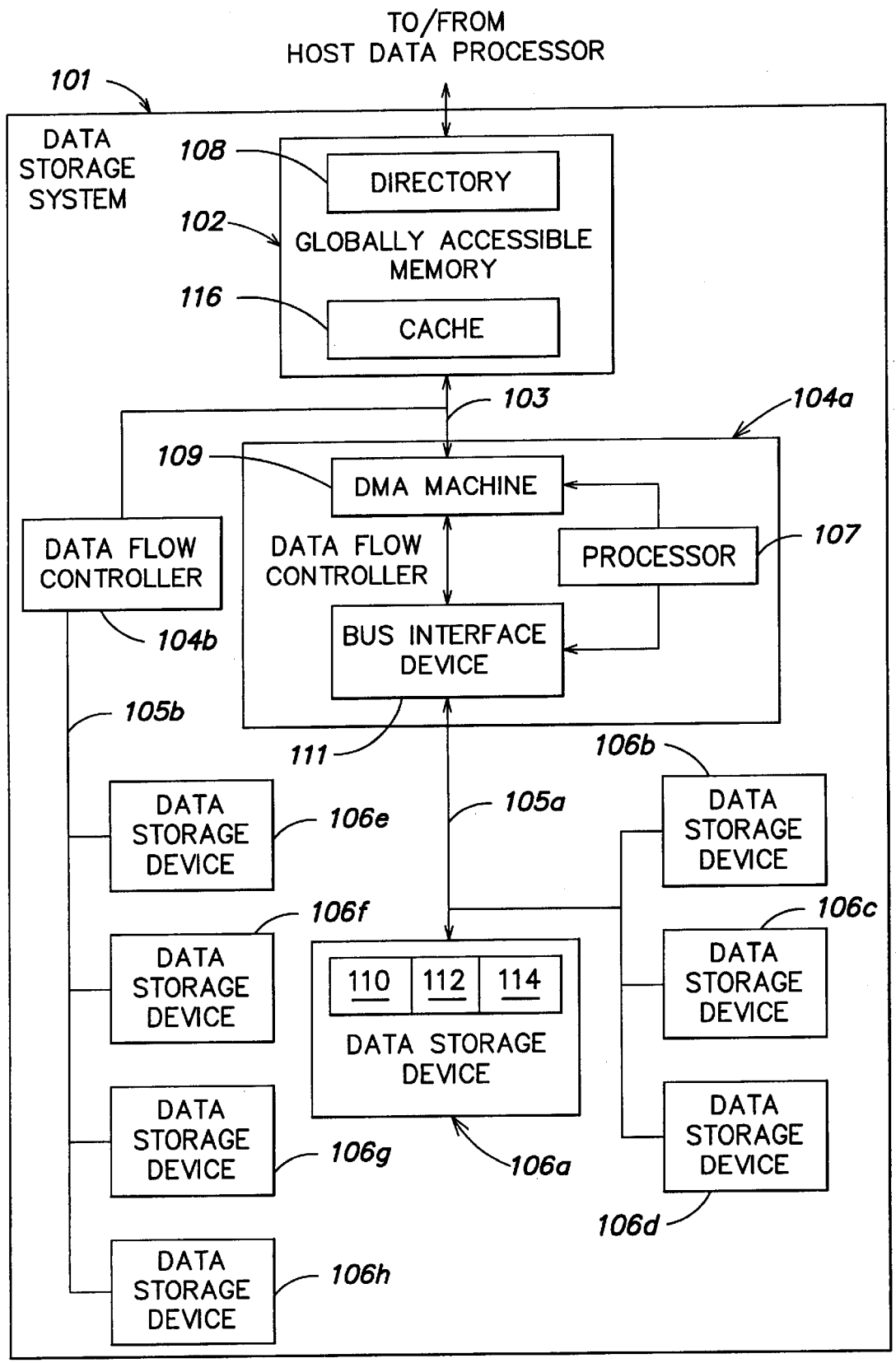
FIG. 1 is a block diagram of a prior art data storage system.

According to one embodiment of the present invention, a method and apparatus is provided for using a single I/O operation to destage data from a cache to at least two non-contiguous storage locations without overwriting the contents of one or more storage locations disposed between the non-contiguous storage locations. As compared with the two prior art methods described above, the use of a single I/O operation, rather than multiple I/O operations, to perform the destaging significantly reduces the time taken to destage the data. In some embodiments of the invention, these two or more non-contiguous storage locations may be located on different data storage devices. To simplify the following description, the several examples discussed below involve non-contiguous storage locations located on the same storage device. The invention, however, is not limited to embodiments in which the two or more non-contiguous storage locations are located on the same device.

The present invention can be implemented in systems employing any of numerous different architectures and communication protocols to transfer data from the cache to the data storage device. The invention is not limited to any particular architecture or protocol. According to one embodiment described below for illustrative purposes, the invention is used in a storage system having the architecture shown in FIG. 2, and a SCSI bus is used for communication between the data flow controller and the data storage device(s), such that the single I/O operation used to destage data may constitute a single SCSI I/O process. However, the present invention is not limited to use with a system having the architecture shown in FIG. 2 or to a SCSI bus for communicating between the data flow controller and the data storage device.

According to one embodiment, data is destaged (during a single I/O operation) from a cache to at least two non-contiguous groups of storage locations of the data storage device by transmitting to the data storage device: (1) several units of write-pending data, and (2) information identifying at least two storage locations of the data storage device to which the data is to be written, and further identifying at least one storage location disposed between the at least two storage locations to which the data is not to be written. This information may be transmitted to the data storage device in any of numerous ways, and the invention is not limited to any particular method. According to one embodiment, for example, the information may be transmitted to the data storage device by specifying: (1) an address of a first storage location to which one of the several units of data is to be written, and (2) one or more storage locations between the non-contiguous groups of storage locations that are to be skipped as the data units are being sequentially destaged to the data storage device during the I/O operation. In this manner, data may be destaged to only certain ones of a larger group of contiguous storage locations during the single I/O operation, which larger group includes both the non-contiguous groups of storage locations to which data is being destaged and the storage locations disposed between them.

Figure 2:
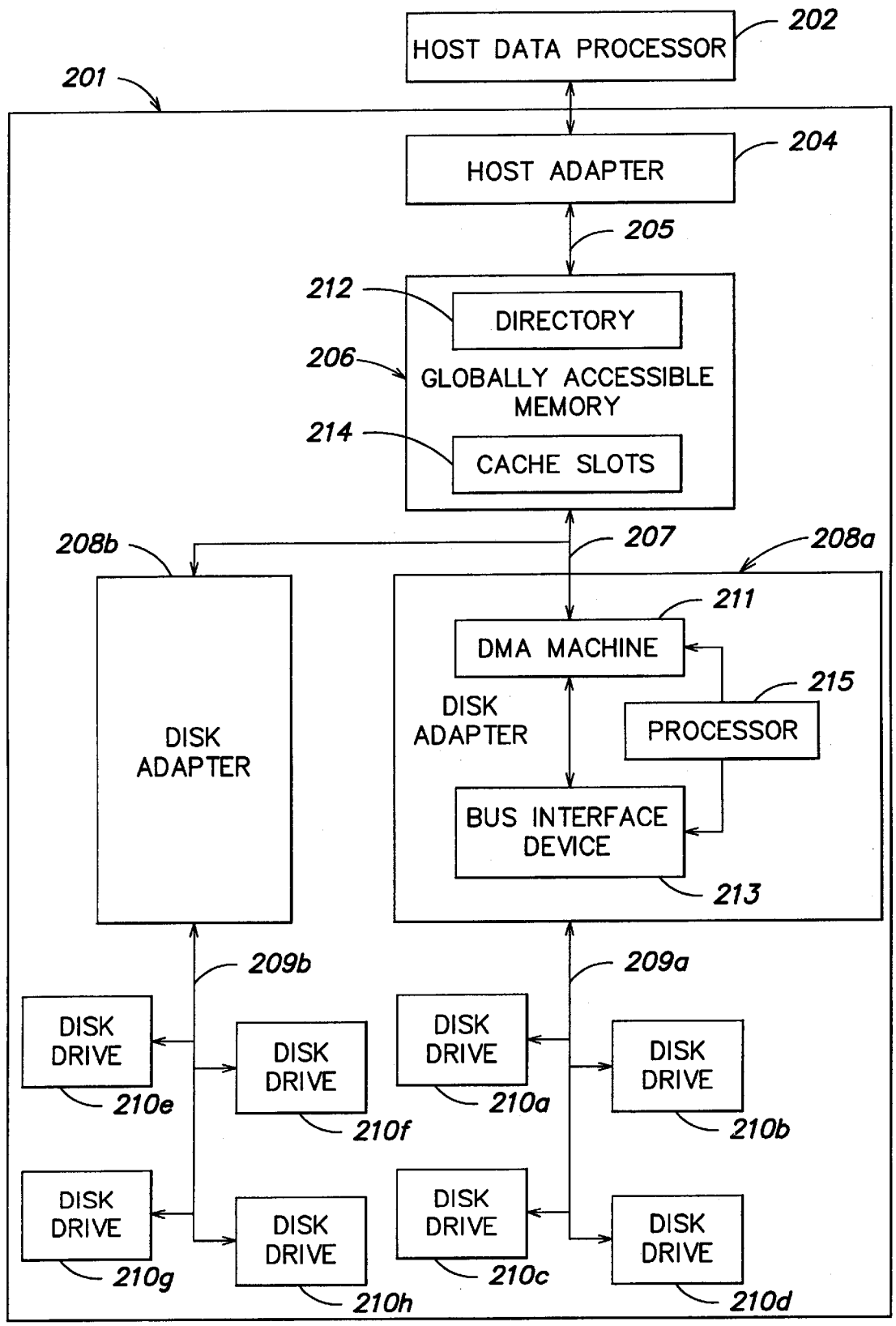
FIG. 2 is a block diagram of a data storage system with which various embodiments of the present invention may be employed.

An example of a data storage system 201 in which the present invention may be employed is shown in FIG. 2. As shown, the data storage system 201 may be coupled to a host data processor 202 to store data for the host data processor 202. The exemplary data storage system shown includes several disk drives 210a–h, and several data flow controllers 204, 208a–b. A globally accessible memory 206 is accessible to each of the data flow controllers 204, 208a–b. One of the data flow controllers 204 is referred to as a host adapter, and the other two data flow controllers 208a–b are referred to as disk adapters. The host adapter 204 and the disk adapters 208a–b operate together, along with the globally accessible memory 206, to transfer data between the host data processor 202 and the disk drives 210a–h. Specifically, the host adapter 204 services requests from the host data processor 202, and the disk adapters 208a–b service data transfers between the globally accessible memory 206 and the disk drives 210a–h. It should be understood, however, that both types of data flow controllers need not be used, and that a single data flow controller may be employed to perform the function of both units. The invention is not limited to any particular configuration of data flow controllers, or to any particular architecture for the storage system 201.

It should be appreciated that a typical data storage system can include many more host adapters, disk adapters and disk drives than are shown in FIG. 2. It should further be appreciated that each host adapter, disk adapter, and disk drive typically has a resident processor (e.g., a microprocessor) and local memory that are used to control its operation.

In the exemplary system 201, the disk drives 210a–h and the disk adapters 208a–b are specific examples of data storage devices and data flow controllers that may be used in connection with the invention. It should be appreciated, however, that other types of data storage devices (e.g., tape drives, random access memories, etc.), and other types of data flow controllers may alternatively be used, and that the invention is not limited to the use of any particular type of data storage device or any particular type of data flow controller.

Communication between the globally accessible memory 206 and the host adapter 204 and the disk adapters 208a–b may be accomplished, respectively, over busses 205 and 207. Each of the disk adapters 208a–b may be coupled to a subset of the disk drives 210a–h in the system. The disk adapters 208a–b can communicate with their respective disk drives via busses 209a–b.

The manner in which the host adapter 204 and disk adapters 208a–b may operate to enable the host data processor 202 to read data from and write data to the disk drives 210a–h in the cached system of FIG. 2 will now be briefly described. Caching operations are performed by the host adapter 204 and disk adapters 208a–b in a manner that is transparent to the host data processor. A read operation can cause the host adapter 204 to scan a directory 212 in the globally accessible memory 206 for the requested data, and when the requested data is in one of cache slots 214, the host adapter 204 can transfer the data from the cache slot 214 to the host data processor 202. If the requested data is not in the cache slots 214, the disk adapters 208a–b determine on which disk drive(s) the data is stored, and transfer the data from the disk drive(s) to the cache slots 214. The host adapter 204 then can transfer the requested data from the cache slots 214 to the host data processor 202.

For write operations, the data initially is written to the cache slots 214 by the host adapter 204, which may indicate to the host data processor 202 that the write is complete as soon as the data is verified as having been stored, error-free, in the cache slots 214. The host adapter then can set a write-pending flag in the directory 212 indicating that the cache slots 214 currently contain data to be destaged to one or more of the disk drivers 210a–h. When one of the disk adapters 208a–b identifies a set write-pending flag for data that is to be destaged to one or more of its disk drives, that disk adapter can a synchronously destage the write-pending data to the appropriate disk drive(s).

The disk adapters 208a–b may be configured in any of numerous ways to destage data from the globally accessible memory 206 to the disk drives 210a–h, and the invention is not limited to any particular configuration. The embodiment shown in FIG. 2, for example, shows one possible configuration of the disk adapter 208a. As shown, the disk adapter 208a may include a processor 215, a direct memory access (DMA) machine 211, and a bus interface device 213. Examples of how these components may operate to destage data to several non-contiguous groups of storage locations of a disk drive 210a–h are described below in connection with FIGS. 7A–B.

The buses 209a–b may be implemented using any of numerous bus architectures, and the invention is not limited to the use of any particular type of bus. One example of a bus architecture the may be used is the Small Computer System Interface (SCSI) architecture. When a SCSI architecture is used, the bus interface device in each of the disk adapters 208a–b (e.g., the bus interface device 213) may include a SCSI driver, and each of the disk drives 208a–h may also include a SCSI driver (not shown). It should be appreciated, however, that other bus architectures alternatively may be used, and that the invention is not limited to the use of a SCSI bus.

A SCSI architecture permits several devices to communicate with one another using a single bus. A device that issues a command on a SCSI bus (via a SCSI driver) is called an initiator, while the device that receives and executes the command is called a target. Each device connected to a SCSI bus is uniquely identified by a SCSI ID, which also serves as its address. At any given time, only two of the devices on a SCSI bus may communicate with each other, with no other devices being permitted to take part in the two-way exchange. Each device is permitted to access the SCSI bus only when no other devices are using it. An initiator begins a transaction on the SCSI bus by selecting a target. However, as soon as the selection is complete, the target takes control of the bus protocol.

All transactions of the SCSI bus are composed from eight distinct bus phases: BUS FREE, ARBITRATION, SELECTION, RESELECTION, COMMAND, DATA, MESSAGE, and STATUS. At any given time, the SCSI bus can be in only one of these bus phases.

Every SCSI transaction begins and ends with the BUS FREE phase. BUS FREE describes the situation where no device is in control of the SCSI bus.

Three phases, ARBITRATION, SELECTION, and RESELECTION, deal exclusively with bus protocol. During the ARBITRATION phase, one or more initiators will indicate their wish to use the bus. If more than one initiator arbitrates for the bus, the one with the highest SCSI ID wins. The successful initiator then uses the SELECTION phase to choose a target with which to communicate. The RESELECTION phase, in contrast, is used by a target that has already been selected by an initiator, but that has temporarily disconnected from it. That is, a target that has been selected by an initiator can temporarily release the bus and disconnect from its initiator, and then reconnect to its initiator by arbitrating for the bus during the ARBITRATION phase and reselecting its initiator during the RESELECTION phase.

Finally, there are four phases, COMMAND, DATA, MESSAGE, and STATUS, that can be used to exchange data on the SCSI bus. The COMMAND phase is used for transferring SCSI command operational codes (op-codes), the DATA phase is used for transferring data bytes, the MESSAGE phase is used for transferring information concerning the protocol itself, and the STATUS phase is used by the target to conclude a SCSI transaction and inform the initiator of its success or failure.

By examining the first command byte transmitted during the COMMAND phase, the target can tell how many additional command bytes will follow. The target collects all command bytes from the initiator before ending the COMMAND phase.

Almost all SCSI transactions employ a DATA phase. This is how control information and user data are exchanged between target and initiator. After a target has begun a DATA phase, either asynchronous or synchronous transfers may take place, depending on a previous agreement between the two devices. If the target wishes to send data to the initiator, it asserts an I/O signal indicating a DATA IN phase. On the other hand, when the target wishes to receive data it de-asserts the I/O signal for a DATA OUT phase.

A target uses the STATUS phase to send status information to an initiator after the completion of a SCSI transaction. After sending status information to the initiator, the target releases the bus and a final BUS FREE phase is reached.

Each transaction between a target and an initiator on a SCSI bus includes an input/output (I/O) process. An I/O process begins with the initial selection of a target by an initiator (during a SELECTION phase) and extends through all BUS FREE and RESELECTION phases until a final BUS FREE phase (following a STATUS phase) is reached. The relationship between an initiator and a target during an I/O process is called a nexus. A nexus is established when the initial selection of a target takes place, and is de-established when the final BUS FREE phase is reached.

As discussed above, according to one embodiment of the invention, information may be transmitted to the data storage device, in addition to several units of write-pending data, that specifies: (1) an address of a first storage location to which one of the several units of data is to be written, and (2) one or more storage locations between two or more non-contiguous groups of storage locations that are to be skipped as the data units are being sequentially destaged to the data storage device during an I/O operation.

This information may be transmitted to the data storage device in any of numerous ways, and the invention is not limited to any particular method. According to one embodiment of the invention in which a SCSI bus is employed, for example, the information may be transmitted to the data storage device by transmitting commands to the data storage device during a COMMAND phase of a SCSI transaction. For example, both a WRITE command and another SCSI command may be transmitted during the COMMAND phase to transmit the information. In such an embodiment, the address of the first of the storage location to which one of the units of data is to be destaged, as well as a total number of data units being destaged during the I/O process, may be specified by the WRITE command. The other SCSI command can transmit the information regarding the addresses to be skipped. According to one embodiment, one of the available customer-defined SCSI commands may be used to transmit a mask identifying storage locations to be skipped (hereinafter a SKIPMASK command) when destaging data. Examples of command sequences that may be transmitted during a COMMAND phase of a SCSI transaction to transmit appropriate information to data storage devices in particular situations are described below in connection with FIGS. 7A–B.

The globally accessible memory 206 may be configured in any of numerous ways, and the invention is not limited to any particular configuration. The embodiment shown in FIG. 2, for example, shows one possible configuration of the globally accessible memory 206. As shown, the globally accessible memory 206 may include a directory 212 and a plurality of the cache slots 214. When the host data processor 202 writes data (via host adapter 204) to the cache slots 214, one or more write-pending flags may be set in the directory 212 to identify the presence of the write-pending data in the cache slots 214. An exemplary embodiment of a group of write-pending flags in the directory 212 is described below in connection with FIG. 6.

The disk adapters 208a–b may periodically scan the directory 212 for set write-pending flags. When one of the disk adapters 208a–b identifies one or more set write-pending flags, it may destage the data from the cache slots 214 to one of the disk drives 210a–h serviced thereby. A more detailed example of how the directory 212 and the cache slots 214 may be configured and how they may be employed according to one embodiment of the invention is described below.

In the example shown in FIG. 2, data may be transferred between the host data processor 202 and the disk drives 210a–h in fixed-sized blocks (e.g., 512 bytes) so that the system 201 has a fixed-block architecture (FBA) format. A data storage system 201 using an FBA format may be viewed as a large array of fixed-sized blocks. It should be appreciated, however, that data storage devices 210a–h used in connection with the invention need not store data according to an FBA format, and that the size of blocks of data may vary from storage device to storage device and within individual storage devices. The invention is not limited to any particular data storage format. For simplicity of discussion, however, it will be assumed that data is transferred between the host data processor 202 and the disk drives 210a–h only in blocks having a fixed size, for example, 512 bytes.

Disk drives 210a–h may be configured in any of numerous ways, and the invention is not limited to any particular configuration. The embodiment shown in FIG. 3, for example, shows one possible configuration of a disk drive 210. As shown, the disk drive 210 may include a group of platters 300 (including eight individual platters 302–316) which are arranged concentrically, one atop another. Each platter may be divided into a plurality of concentric physical tracks, each capable of storing a logical track of data. For example, a physical track T1 is the outermost track of the top platter 302. Each platter may have physical tracks on each of its two surfaces. In the example shown in FIG. 3, the top surfaces of the platters constitute odd numbered physical tracks and the bottom surfaces constitute even numbered physical tracks.

Each physical track, in turn, may be divided into a plurality of physical blocks, each having a unique PBA and being capable of storing a logical block of data. For example, the physical track T1 of the platter 302 may be divided into one hundred and twenty-eight physical blocks B1–B128. Each set of vertically stacked physical tracks on platters 300 that overlie one another is called a physical cylinder. For example, the physical tracks T1–T15 all may be arranged in a physical cylinder C1. The example shown in FIG. 3 includes a total of "n" physical cylinders, i.e., physical cylinders C1–Cn. A disk drive, such as that shown in FIG. 3, may store more than one logical volume of data. For simplicity of discussion, however, it will be assumed that each disk drive stores only a single logical volume.

Figure 3:
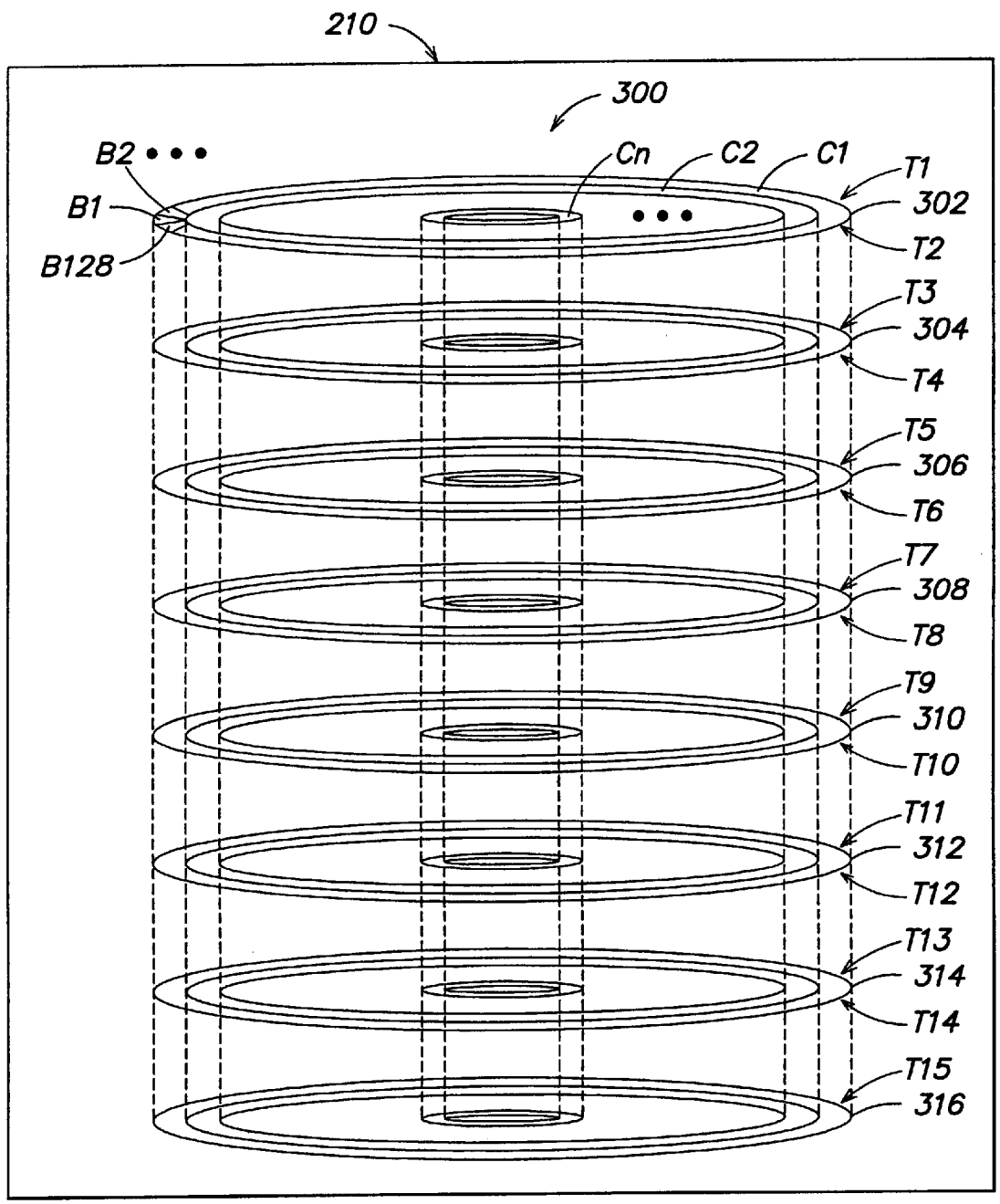
FIG. 3 is an illustration of a disk drive that may be used in connection with various embodiments of the present invention.
Figure 4:
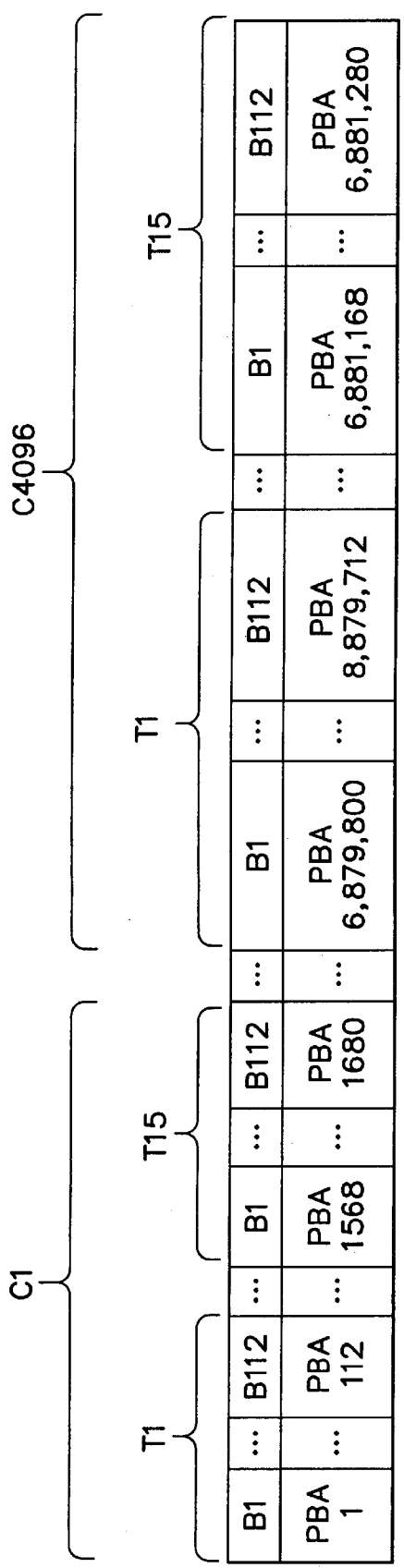
FIG. 4 is a diagram showing one possible manner in which physical block addresses can be correlated with physical storage locations of the disk drive shown in FIG. 3.

The PBAs of a data storage device may correspond to actual storage locations in the device in any of numerous ways, and the invention is not limited to any particular manner of correspondence. FIG. 4 shows one example of how the PBAs of one of the disk drives 210a–h (FIG. 3) may correspond to the physical storage locations (at the block level) in the disk drive 210. In the example shown, the disk drive 210 includes four thousand and ninety-six physical cylinders, each physical cylinder includes fifteen physical tracks, and each physical track includes one hundred and twelve physical blocks. The exemplary disk drive 210 therefore may be used to store a logical volume including "6,881,280" (6,881,280=4096*15*112) logical blocks of data, with each logical block of data having a unique LBA and being stored by a distinct physical block having a unique PBA. In such a case, the disk adapter 208 may translate consecutive LBAs of the logical volume to consecutive PBAs of the disk drive 210. In one embodiment, each logical cylinder of a logical volume, and each logical track within each logical cylinder, may be stored by a corresponding physical cylinder and physical track of the disk drive 210.

Figure 5:
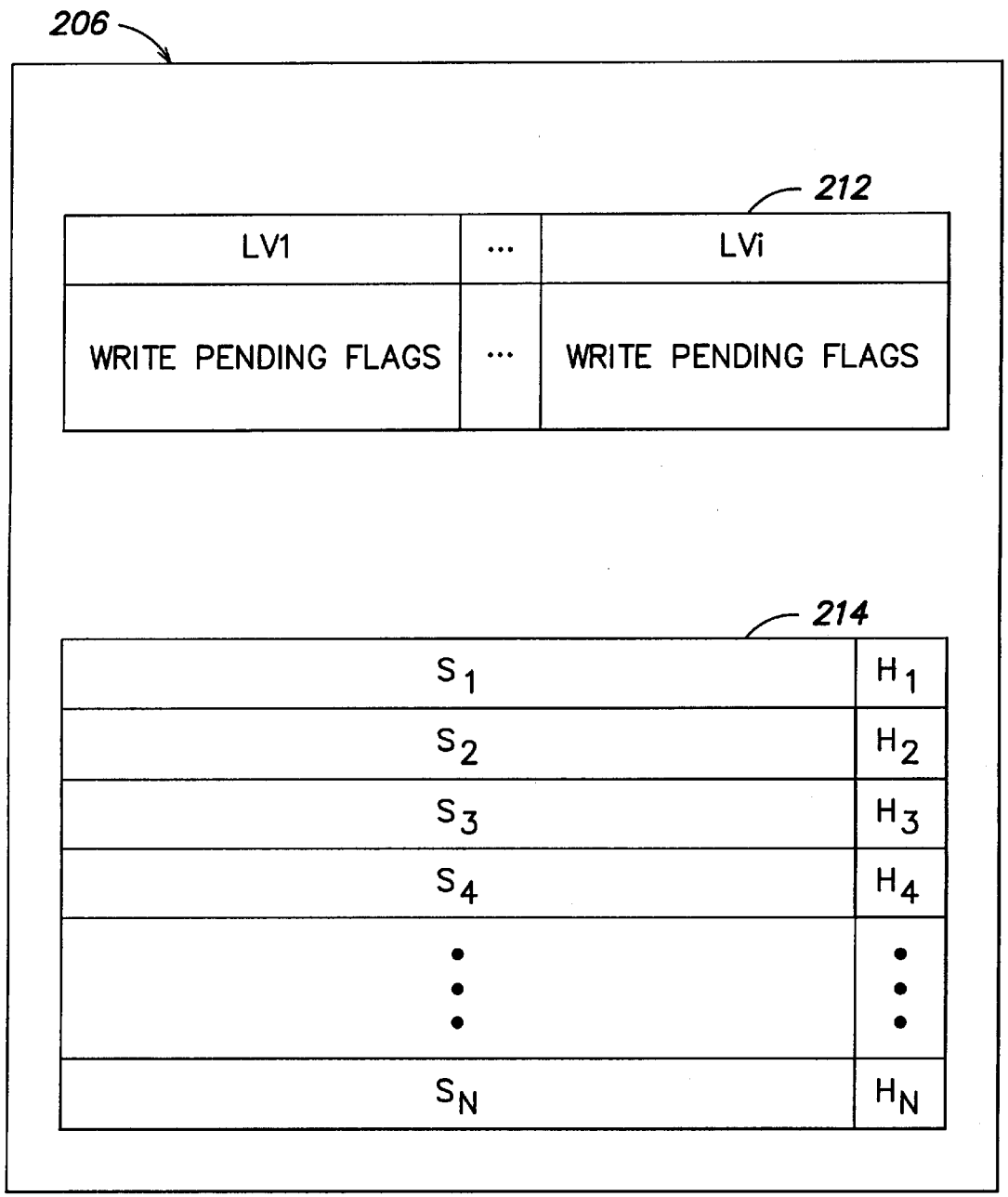
FIG. 5 is a block diagram illustrating one possible configuration of the globally accessible memory shown in FIG. 2.

The directory 212 and the cache slots 214 of the globally accessible memory 206 may be configured in any of numerous ways, and the invention is not limited to any particular configuration. The embodiment shown in FIG. 5, for example, illustrates one possible configuration of each of these components. As shown, the directory 212 may include a group of write-pending flags for each of "i" logical volumes ($LV_1$–$LV_i$) stored by the data storage system, and the cache slots 214 may include a total of "N" individual cache slots ($S_1$–$S_N$). According to one embodiment of the invention, each of the slots $S_1$–$S_N$ may be configured to store one logical track of data (e.g., one hundred and twelve logical blocks).

The contents of each of the cache slots $S_1$–$S_N$ may be identified in any of numerous ways, and the invention is not limited to any particular identification method. In the embodiment shown in FIG. 5, for example, a holder (e.g., one of the holders $H_1$–$H_N$) is associated with each slot and identifies the slot as being currently assigned to store a particular logical track of a particular logical cylinder of a particular logical volume. The holders $H_1$–$H_N$ also may contain information regarding which records within the slot contain write-pending data. A record may include a single logical block or several logical blocks of data that are to be destaged to one or more contiguous PBAs of the disk drive 210*a*. For example, at a given time, the slot $S_1$ may store "n" records of write-pending data, with each record including "m" blocks of data that are to be destaged to a respective group of "m" contiguous PBAs of the disk drive 210*a*. It should be appreciated, however, that each record in a slot need not contain the same number of blocks of data.

According to one embodiment, because each of slots $S_1$–$S_N$ is the length of a logical track, data may be written to block-sized sections of these slots that correspond one-to-one to the physical blocks within a physical track of the disk drive 210*a*. Therefore, according to one embodiment, the one hundred and twelve block-sized sections in each of slots $S_1$–$S_N$ correspond one-to-one with the one hundred and twelve physical blocks included in a physical track of one of the disk drives 210*a*–*h*.

Enough slots $S_1$–$S_N$ may be provided to service a large number of reads or writes simultaneously. According to one embodiment, the storage capacity of the cache slots 214 is approximately five-percent of the total storage capacity of the storage system 201.

The write-pending flags in the directory 212 may be configured in any of numerous ways, and the invention is not limited to any particular configuration. The embodiment shown in FIG. 6, for example, shows one possible configuration of a group of write-pending flags in the directory 212 for a single logical volume of data wherein the logical cylinders and logical tracks of the logical volume correspond one-to-one, respectively, with the physical cylinders and physical tracks of the disk drive(s) 210 that store the logical volume. According to the exemplary embodiment shown in FIG. 6, each group of write-pending flags may be used to identify, for each logical track of the logical volume represented by the flags, whether data has been written to one of the cache slots 214 (FIG. 5) and has not yet been destaged to the disk drive(s) 210. A similar group of write-pending flags can be provided for each logical volume stored by the data storage system.

Figure 6:
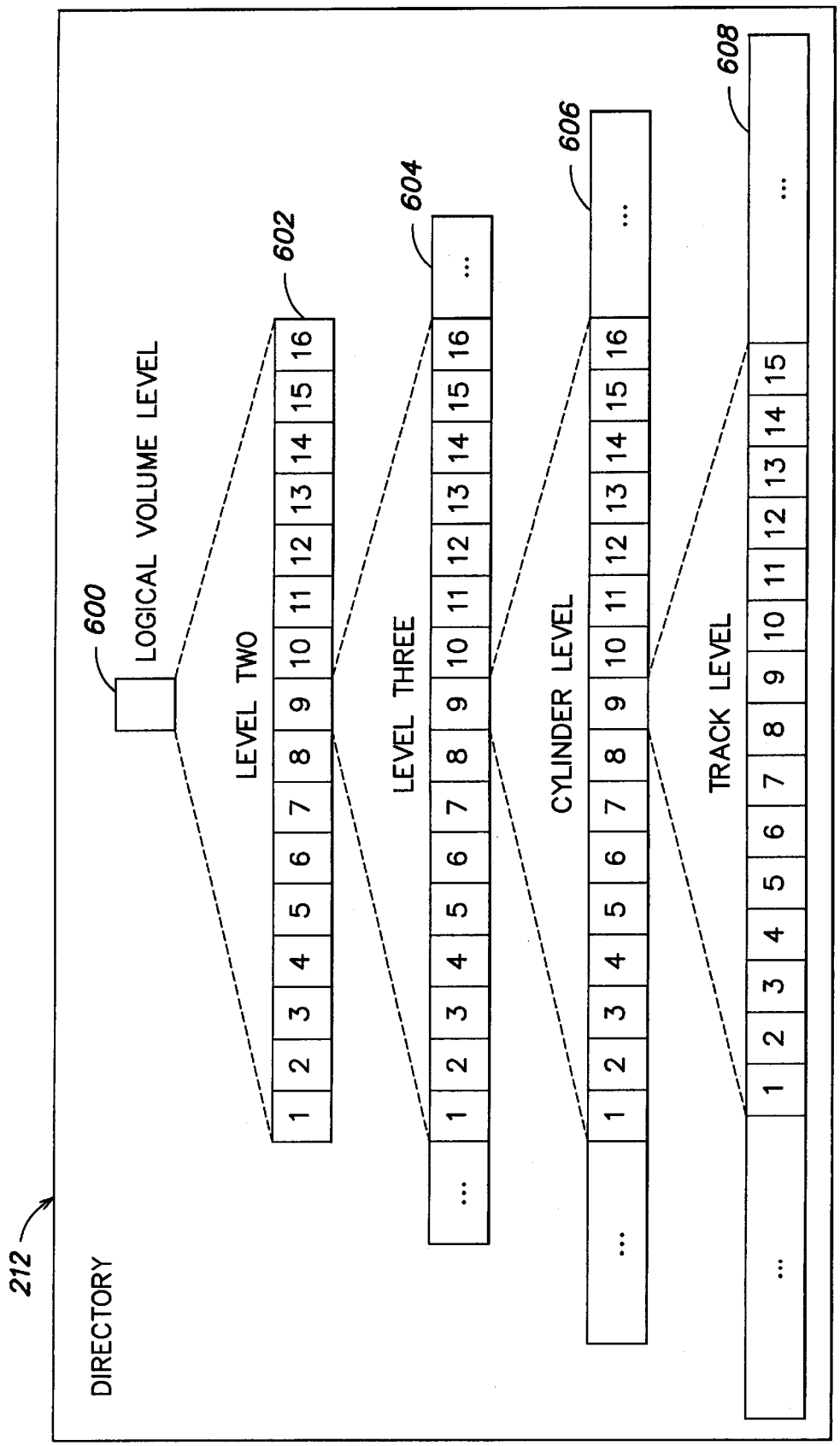
FIG. 6 is a block diagram illustrating one possible configuration of the directory shown in FIGS. 2 and 5.

As explained in more detail below, the flags in FIG. 6 may be arranged in a tree-like structure to facilitate the process of searching for write-pending flags that have been set for the logical volume. As shown, the exemplary flags shown in FIG. 6 are organized in several hierarchical levels of flags 600, 602, 604, 606, and 608. The lowest level of flags, i.e., the track-level flags 608, includes a write-pending flag for every logical track included in logical volume represented by the flags. In the example described above, each disk drive 210 includes four thousand and ninety-six physical cylinders, with each physical cylinder including fifteen physical tracks. Therefore, the track-level flags 608 in the example shown include 61,440 individual write-pending flags.

According to one embodiment, each time the host data processor 202 writes one or more blocks of data to one of the cache slots 214, in addition to updating the contents of the holder associated with the slot as described above, the host adapter 204 sets the appropriate one of the "61,440" track-level flags 608 in the directory 212 for the logical volume in which the blocks of data are included to indicate that there is write-pending data in one of the slots for the logical track corresponding to the set track-level flag 608.

In the exemplary embodiment shown in FIG. 6, the track-level flags 608 are arranged into groups of fifteen flags representing the fifteen logical tracks associated with each logical cylinder. Each group of fifteen track-level flags is associated with one of the "cylinder-level" flags 606. The cylinder-level flags 606 include four thousand and ninety-six individual write-pending flags, one corresponding to each logical cylinder included in the logical volume represented by the flags in the directory 212. If any of the fifteen track-level flags 608 associated with a particular cylinder-level flag 606 is set, then the cylinder-level flag 606 with which it is associated also is set.

Similarly, in the exemplary embodiment shown, each group of sixteen cylinder-level flags 606 is associated with a single level-three flag 604 (for a total of two hundred and fifty-six level-three write-pending flags 604), each group of sixteen level-three flags 604 is associated with a single level-two flag 602 (for a total of sixteen level-two write-pending flags 602), and the sixteen level-two flags 602 are associated with a single logical volume-level flag 600. Each of the write-pending flags 600, 602 and 604 is set only if one or more of the sixteen flags corresponding to it at the next lowest level are set.

For each of the disk drives 210*a*–*h* (FIG. 2) that stores the logical volume represented by the tree-like flag structure shown in FIG. 6, the one of the disk adapters 208*a*–*b* that services the disk drive 210 may simply scan the single logical volume-level flag 600 periodically to see whether any of the cache slots 214 include entries to be destaged to that disk drive 210. If, upon scanning the logical volume-level flag 600, the disk adapter 208 determines that this flag is set, then the disk adapter 208 may scan the sixteen level-two flags 602 to identify which of them caused the logical volume level flag 600 to be set. For each of the second level flags 602 that is set, the disk adapter 208 may then scan the sixteen level-three flags 604 that are associated with it to identify which of the level-three flags 604 caused the level-two flag 602 to be set. Similarly, for each of the level-three flags 604 that is set, the disk adapter 208 may then scan the sixteen cylinder-level flags 606 that are associated with it to identify which of the cylinder-level flags 606 caused the level-three flag 604 to be set. When a disk adapter 208a–b scans the flags in the directory 212 in this manner, it can identify all of the logical tracks of the logical volume represented by the flags for which write-pending data exists in the cache slots 214 by scanning only a subset of the track-level flags 608, rather than having to scan each of the track-level flags 608 in connection with each search of the directory 212. For example, if two or more of the track-level flags 608 corresponding to the logical tracks in a single logical volume were set, the disk adapter 208 could identify that these were the only set track-level flags 608 by scanning only sixty-four write-pending flags in the directory 212 (i.e., one logical volume flag 600, sixteen flags at each of flag levels 602–606, and fifteen track-level flags 608), rather than scanning each of the "61,440" track-level flags 608 individually.

According to the exemplary embodiment shown, each of the cylinder-level flags 606 corresponds to one of the four thousand and ninety-six logical cylinders included in the logical volume represented by the flags in the directory 212. Therefore, a set cylinder-level flag 606 indicates that there is write-pending data in at least one of the cache slots 214 that is to be destaged to the physical cylinder of the disk drive(s) 210 that stores the logical cylinder with which the flag corresponds.

For each of the cylinder-level flags 606 that is set, the disk adapter 208 may scan the fifteen track-level flags 608 associated with it to identify which of the track-level flags 608 caused the cylinder-level flag 606 to be set. A set track-level flag 608 indicates that there is at least one logical block of data in one of the cache slots $S_1$–$S_N$ that is to be destaged to the physical track that corresponds to the logical track represented by the set track-level flag.

After the disk adapter 208 (FIG. 2) has scanned the write-pending flags and identified that there is write-pending data in one or more of the cache slots $S_1$–$S_N$ for a logical volume, the disk adapter 208 may then scan the holders $H_1$–$H_N$ to identify which slot(s), and which records within these slot(s), contain the write-pending data for the logical track(s) identified by the write-pending flags. After these records have been identified, the disk adapter 208 may then proceed to destage the data included in the records to the appropriate disk drive(s) 210.

In the prior art systems discussed above, if upon scanning the directory 212 the disk adapter 208a identified that data was to be destaged to two or more non-contiguous groups of storage locations of the disk drive 210a, then at least two separate I/O operations had to be initiated to destage the data. One embodiment of the present invention overcomes at least this drawback in the following manner.

According to one embodiment of the invention, when data is destaged to the disk drive 210a, information may be transmitted to the disk drive instructing it to write units of data to two or more non-contiguous storage locations. The information may be in any of numerous forms, and the invention is not limited to the use of any particular form. According to one embodiment, the information may include two distinct pieces of information: (1) a first piece that identifies a single group of contiguous storage locations, and (2) a second piece that identifies storage locations within the group of contiguous storage locations that are to be skipped (i.e., not overwritten) during the destaging process. The information may be transmitted to the disk drive 210a, for example, in connection with a single I/O operation during which the data is destaged to the disk drive 210a.

According to one embodiment of the invention, the processor 215 (FIG. 2) may program the DMA machine 211 to access multiple blocks of write-pending data in the cache slots 214 in sequence according to the PBAs to which the blocks of data are to be written, and to make these blocks of data available (in sequence) to the bus interface device 213. Additionally, the processor 215 may cause the bus interface device 213 to initiate an I/O operation during which the bus interface device 213 sends information to the disk drive 210a indicating at least two non-contiguous PBAs to which the sequentially-accessed blocks of data are to be written. In this manner, the bus interface device 213 may instruct the disk drive 210a to store two or more sequentially-transmitted blocks of data received from the bus 209a to non-sequential (or non-contiguous) PBAs.

The bus interface device 213 may send this information to the disk drive 210a in any of numerous ways, and the invention is not limited to any particular method. According to one method, for example, the bus interface device 213 can send the information to the disk drive 210a by transmitting a pair of linked commands to the disk drive 210a. For example, when a SCSI bus is used, this pair of linked commands may be transmitted during a COMMAND phase of an I/O process, and may include: (1) a WRITE command, and (2) a SKIPMASK command. An example of such a pair of linked commands that may be used with a SCSI bus architecture is illustrated in the following table:

| Command 1 = WRITE | Beginning PBA | # of Blocks |
|---|---|---|
| Command 2 = SKIPMASK | # of bits in Skipmask | Skipmask |

Although in this example, and in the examples of linked commands given below in connection with FIGS. 7A–B, the two SCSI commands are transmitted in a particular order, it should be understood that the order in which these commands are transmitted is not important. In fact, in one embodiment, the SKIPMASK command is transmitted before the WRITE command during a COMMAND phase of a SCSI I/O process.

As shown in the table above, the first command transmitted to the disk drive 210a during the COMMAND phase may be a WRITE command. The WRITE command can identify: (a) the PBA of the storage location of the disk drive 210a to which the first of the blocks of data from cache slots 214 (made available to the bus interface device 213 via the DMA machine 211) is to be destaged during the I/O operation, and (b) the total number of blocks that are to be destaged during the I/O operation. The second command transmitted to the disk drive 210a during the COMMAND phase may be a SKIPMASK command. In conjunction with the WRITE command, the SKIPMASK command can identify at least two storage locations to which blocks of data are to be destaged, and at least one storage location (between the storage locations to which blocks of data are to be destaged) that is to be skipped during the destaging procedure.

According to one embodiment, the SKIPMASK command may include information regarding: (a) a total number of bits included in the skipmask, and (b) a series of bits constituting the skipmask itself. The total number of bits included in the skipmask may, for example, be equal to the sum of: (1) the number of physical blocks to which data is to be written during the I/O operation, and (2) the number of physical blocks to be skipped (i.e., to which data is not to be written during the I/O operation) between the physical blocks to which data is to be written. Thus, the skipmask can include a bit for each of a corresponding series of contiguous physical blocks, including physical blocks to which data is to be destaged and physical blocks that are to be "skipped."

Any number of bits may be included in a skipmask. According to one embodiment, the SKIPMASK command is implemented using a vendor-specific command (e.g., SCSI op-code "EA") which permits two thousand bits to be included in a skipmask. In such an embodiment, blocks of data may be written to non-contiguous storage locations having as many as "1998" intermediate storage locations between them. As described in more detail below, a skipmask may be generated on a per-cylinder basis, so that all of the blocks of write-pending data for a given cylinder may be destaged during a single I/O operation, regardless of whether the blocks are to be destaged to contiguous or non-contiguous physical blocks of one of the disk drives 210a–h. Examples of how a skipmask may be used according to different aspects of the invention are illustrated below.

Figure 7A:
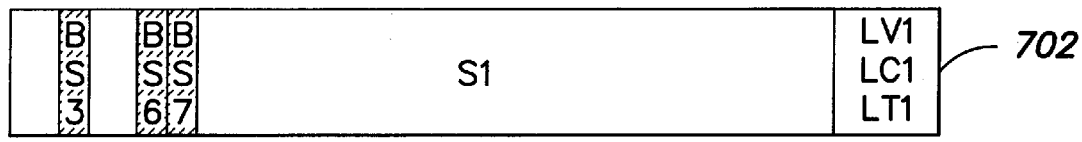
FIGS. 7A–B are block diagrams illustrating how the cache slots shown in FIGS. 2 and 5 may appear when they contain write-pending data.
Figure 7B:
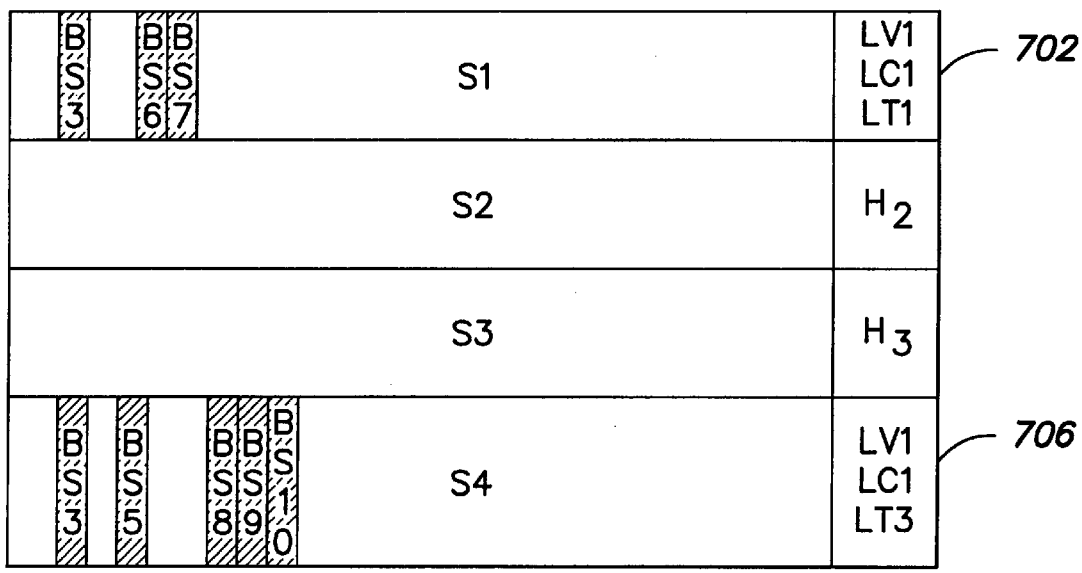

FIGS. 7A and 7B illustrate, respectively, how the cache slots 214 may appear when blocks of write-pending data are to be destaged from several block-sized sections of one or more of the slots $S_1$–$S_N$ to: (A) two non-contiguous groups of physical blocks (wherein each group includes one or more contiguous physical blocks) within the same physical track of a disk drive 210a–h, and (B) five non-contiguous groups of physical blocks (wherein each group includes one or more contiguous physical blocks) within two non-contiguous physical tracks of a disk drive 210a–h. In these examples, it will be assumed that the logical cylinders and logical tracks of data correspond one-to-one with the physical cylinders and physical tracks of the disk drive(s) 210 that store them. Also, for simplicity of discussion, it will be assumed that only disk drive 210a stores the logical volume LV1. The generation and use of a skipmask to destage the blocks of data to the non-contiguous storage locations (using a single I/O operation) of one of the disk drive 210a in each of these two situations will now be described.

FIG. 7A shows a single slot (i.e., slot $S_1$) of the cache slots 214 that, as shown in holder 702, has been assigned to store data for the logical track LT1 of the logical cylinder LC1 of the logical volume LV1. Assuming the disk drive 210a is configured as illustrated in FIGS. 3–4, the slot $S_1$ in FIG. 7A includes: (1) a single block of write-pending data (stored in block-sized section BS3 of the slot S1) to be destaged to physical block three of the physical track T1 of the physical cylinder C1 of the disk drive 210a, and (2) two blocks of write-pending data (stored in block-sized sections BS6 and BS7 of the slot S1) to be destaged to contiguous physical blocks six and seven of the physical track T1 of the physical cylinder C1 of the disk drive 210a. Therefore, in this example, the slot S1 includes data to be destaged to two non-contiguous groups of physical blocks of the same physical track (i.e., track T1) of the disk drive 210a, with one group including only a single physical block and the other group including two contiguous physical blocks.

As discussed above, using prior art data destaging methods, at least two separate I/O operations would have to be initiated to destage the data in slot $S_1$ to these two non-contiguous groups of storage locations. According to one embodiment of the invention, however, the write-pending data can be destaged from the slot $S_1$ to the two non-contiguous groups of storage locations during a single I/O operation.

As shown in FIG. 7A, the holder 702 associated with the slot $S_1$ identifies the slot $S_1$ as having been assigned to store blocks of write-pending data for the logical track LT1 of the logical cylinder LC1 of the logical volume LV1. As mentioned above, the holder 702 also can contain information identifying the particular records within the slot $S_1$ that contain write-pending data. In the FIG. 7A example, the holder 702 identifies two records of write-pending data: a first record including only logical block three of the logical track LT1 of the logical cylinder LC1 of the logical volume LV1, and a second record including logical blocks six and seven of the logical track LT1 of the logical cylinder LC1 of the logical volume LV1. Block-sized sections BS3, BS6 and BS7 of the slot $S_1$ are highlighted in FIG. 7A for the purpose of illustration only, and are not intended to represent the precise locations of these block-sized sections within the slot $S_1$.

When data was written by the host data processor 202 to the block-sized sections BS3, BS6 and BS7 of the slot $S_1$, corresponding write-pending flags were set in the tree-like flag structure shown in FIG. 6 to indicate that one of the slots 214 includes write-pending data for the logical track LT1 of the logical cylinder LC1 of the logical volume LV1. Because the write-pending data in block-sized sections BS3, BS6 and BS7 of slot $S_1$ is to be written to relatively proximate storage locations (e.g., to storage locations having fewer than "1998" PBAs between them when a SCSI architecture is used), a skipmask may be used to destage these blocks of write-pending data during a single I/O operation.

According to one embodiment of the invention, the processor 215 (FIG. 2) may program the DMA machine 211 to access the block-sized sections BS3, BS6 and BS7 in sequence to make the data stored therein available to the bus interface device 213. That is, the DMA machine 211 may be programmed so that when the bus interface device 213 sequentially requests first, second and third blocks of data from the DMA machine 211, the DMA machine 211 makes the blocks of data stored in block-sized sections BS3, BS6 and BS7 available to the bus interface device 213 in that order. Additionally, to destage this data, the processor 215 may cause the bus interface device 213 to send the following pair of linked commands to the disk drive 210a:

| | | |
|---|---|---|
| Command 1 = WRITE | Beginning PBA = 3 | # of Blocks = 3 |
| Command 2 = SKIPMASK | # of bits in Skipmask = 5 | Skipmask = 10011 |

As shown, the first command in the sequence is a WRITE command (e.g., op-code "2A" if using a SCSI architecture). In the example shown, the information following the WRITE command indicates that the first block of data from the cache slots 214 is to be stored at PBA 3 of the disk drive 210a, and that a total of three blocks of data are to be transferred during the I/O operation. Additionally, the second command in the sequence is a SKIPMASK command. Because, in the example shown, the data is to be destaged to three of a total of five contiguous physical blocks of the disk drive 210a, the skipmask is five bits long. The processor 215 may generate the skipmask based upon the contents of the holder 702. The skipmask according to this example is the binary sequence "10011."

The bits of the skipmask in the FIG. 7A example correspond one-to-one to PBAs 3–7 of the disk drive 210a, with the first bit corresponding to PBA 3 and the last bit corresponding to PBA 7. Each "1" in the skipmask indicates that the block of data that is made available to the bus interface device 213 (via the DMA machine 211) is to be written to the PBA to which the bit in the skipmask corresponds. Each "0" in the skipmask indicates that the PBA to which the bit in the skipmask corresponds is to be skipped and that no data is to be written to it. In this manner, by using a skipmask, data stored in slot $S_1$ may be destaged to two discontiguous groups of contiguous physical blocks of the same physical track of the disk drive 210a during a single I/O operation. Again, it should be appreciated that the invention does not require the use of the SCSI architecture or the specific commands described above, as other bus architectures and/or other commands may alternatively be used.

FIG. 7B shows two slots (i.e., slots $S_1$ and $S_4$) of the cache slots 214 (FIG. 2). Assuming the disk drive 210a is configured as illustrated in FIGS. 3–4, the slot $S_1$ in FIG. 7B includes: (1) a single block of write-pending data (stored in the block-sized section BS3) to be destaged to physical block three of the physical track T1 of the physical cylinder C1 of the disk drive 210a, and (2) two blocks of write-pending data (stored in block-sized sections BS6 and BS7) to be destaged to contiguous physical blocks six and seven of the physical track T1 of the physical cylinder C1 of the disk drive 210a. Also, in the FIG. 7B example, the slot $S_4$ includes: (1) two single blocks of write-pending data (stored in block-sized sections BS3 and BS5) to be destaged, respectively, to physical blocks three and five of the physical track T3 of the physical cylinder C1 of the disk drive 210a, and (2) three blocks of write-pending data (stored in block-sized sections BS8–10) to be destaged to contiguous physical blocks eight through ten of the physical track T3 of the physical cylinder C1 of the disk drive 210a. Therefore, in this example, the slots $S_1$ and $S_4$ include data to be destaged to five non-contiguous groups of physical blocks within two discontiguous physical tracks (i.e., tracks T1 and T3) of the disk drive 210a, with three groups each including a single physical block, one group including two contiguous physical blocks, and one group including three contiguous physical blocks.

Using prior art data destaging methods, at least two separate I/O operations would be initiated to destage the data in slots $S_1$ and $S_4$ to these five non-contiguous groups of storage locations. According to one embodiment of the invention, however, the write-pending data can be destaged from the slots $S_1$ and $S_4$ to the five non-contiguous groups of storage locations using a single I/O operation.

As shown in FIG. 7B, the holder 702 associated with the slot $S_1$ identifies the slot $S_1$ as having been assigned to store blocks of write-pending data for the logical track LT1 of the logical cylinder LC1 of the logical volume LV1, and the holder 706 associated with the slot $S_4$ can identify the slot $S_4$ as having been assigned to store blocks of write-pending data for logical track LT3 of the logical cylinder LC1 of the logical volume LV1. Additionally, as mentioned above, the holder 702 also can contain information identifying the particular records within the slot $S_1$ that contain write-pending data, and the holder 706 can contain information identifying the particular records within the slot $S_4$ that contain write-pending data.

In the FIG. 7B example, the holder 702 identifies two records of write-pending data: a first record including only logical block three, and a second record including logical blocks six and seven. Also, in the FIG. 7B example, the holder 706 identifies three records of write-pending data: a first record including only logical block three, a second record including only logical block five, and a third record including logical blocks eight, nine, and ten. The block-sized sections BS3, BS6 and BS7 of the slot $S_1$ and the block-sized sections BS3, BS5, and BS8–10 of the slot $S_4$ are highlighted in FIG. 7B for the purpose of illustration only, and are not intended to represent the precise locations of these block-sized sections within the slots $S_1$ and $S_4$.

When data was written by the host data processor 202 to the slots $S_1$ and $S_4$, corresponding write-pending flags were set in the tree-like flag structure shown in FIG. 6 to indicate that the slots 214 include write-pending data for the logical tracks LT1 and LT3 of the logical cylinder LC1 of the logical volume LV1. Because the blocks of write-pending data in the block-sized sections BS3, BS6 and BS7 of slot $S_1$ and the block-sized sections BS3, BS5, and BS8–10 of slot $S_4$ are to be written to relatively proximate storage locations (e.g., to storage locations having fewer than "1998" PBAs between them when a SCSI architecture is used), a skipmask may be used to destage these blocks of write-pending data during a single I/O operation.

According to one embodiment of the invention, the processor 215 (FIG. 2) may program the DMA machine 211 to access the block-sized sections BS3, BS6 and BS7 of the slot $S_1$ and the block sized sections BS3, BS5, BS8–10 of the slot $S_4$ in sequence, and to make the data stored therein available to the bus interface device 213. That is, the DMA machine 211 may be programmed so that when the bus interface device 213 sequentially requests eight blocks of data from the DMA machine 211, the DMA machine 211 makes the blocks of data stored in the block-sized sections BS3, BS6 and BS7 of the slot $S_1$ and the block-sized sections BS3, BS5, BS8–10 of the slot $S_4$ available to the bus interface device 213 in that order. Additionally, to destage this data, the processor 215 may cause the bus interface device 213 to send the following pair of linked commands to the disk drive 210a:

| | | |
|---|---|---|
| Command 1 = WRITE | Beginning PBA = 3 | # of Blocks = 8 |
| Command 2 = SKIPMASK | # of bits in Skipmask = 240 | Skipmask = 100110 . . . 010100111 |

As shown, the first command in the sequence is a WRITE command (e.g., op-code "2A" if using a SCSI architecture). In the example shown, the information following the WRITE command indicates that the first block of data from the cache slots 214 is to be stored at PBA 3 of the disk drive 210a, and that a total of eight blocks of data are to be transferred during the I/O operation. The second command in the sequence is a SKIPMASK command. Because, in the example shown, the data is to be destaged to eight of a total of "240" contiguous physical blocks, the skipmask is "240" bits long. The processor 215 may generate the skipmask based upon the contents of the holders 702 and 706. The skipmask according to this example is the binary sequence "100110 . . . 010100111," with the string of "0's" represented by "0 . . . 0" including one hundred and twenty-eight zeros. The bits of the skipmask correspond one-to-one to PBAs 3-243 of the disk drive 210a, with the first bit of the skipmask corresponding to PBA 3, and the last bit in the skipmask corresponding to PBA 243. Each "1" in the skipmask indicates that a block of data made available to the bus interface device 213 (via the DMA machine 211) is to be written to the PBA to which the bit in the skipmask corresponds. Each "0" in the skipmask indicates that the PBA to which the bit in the skipmask corresponds is to be skipped and that no data is to be written to it. In this manner, by using a skipmask, data stored in slots $S_1$ and $S_4$ may be destaged (during a single I/O operation) to five non-contiguous groups of storage locations spanning across two non-contiguous physical tracks, e.g., physical tracks T1 and T3, of the disk drive 210a.

When the disk drive 210a is implemented as illustrated as shown in FIGS. 3–4, each of the examples shown in FIGS. 7A–B illustrates a situation in which write-pending data in the cache slots 214 is to be destaged to physical blocks that are located in the same physical cylinder of a disk drive. As noted above, according to one embodiment, a physical cylinder may include, for example, fifteen tracks of one hundred and twelve physical blocks each, or "1680" physical blocks. By using a mask that is up to two thousand bits long, a single mask can be generated that will permit all current write-pending data for a given physical cylinder to be destaged during a single I/O operation.

Figure 8:
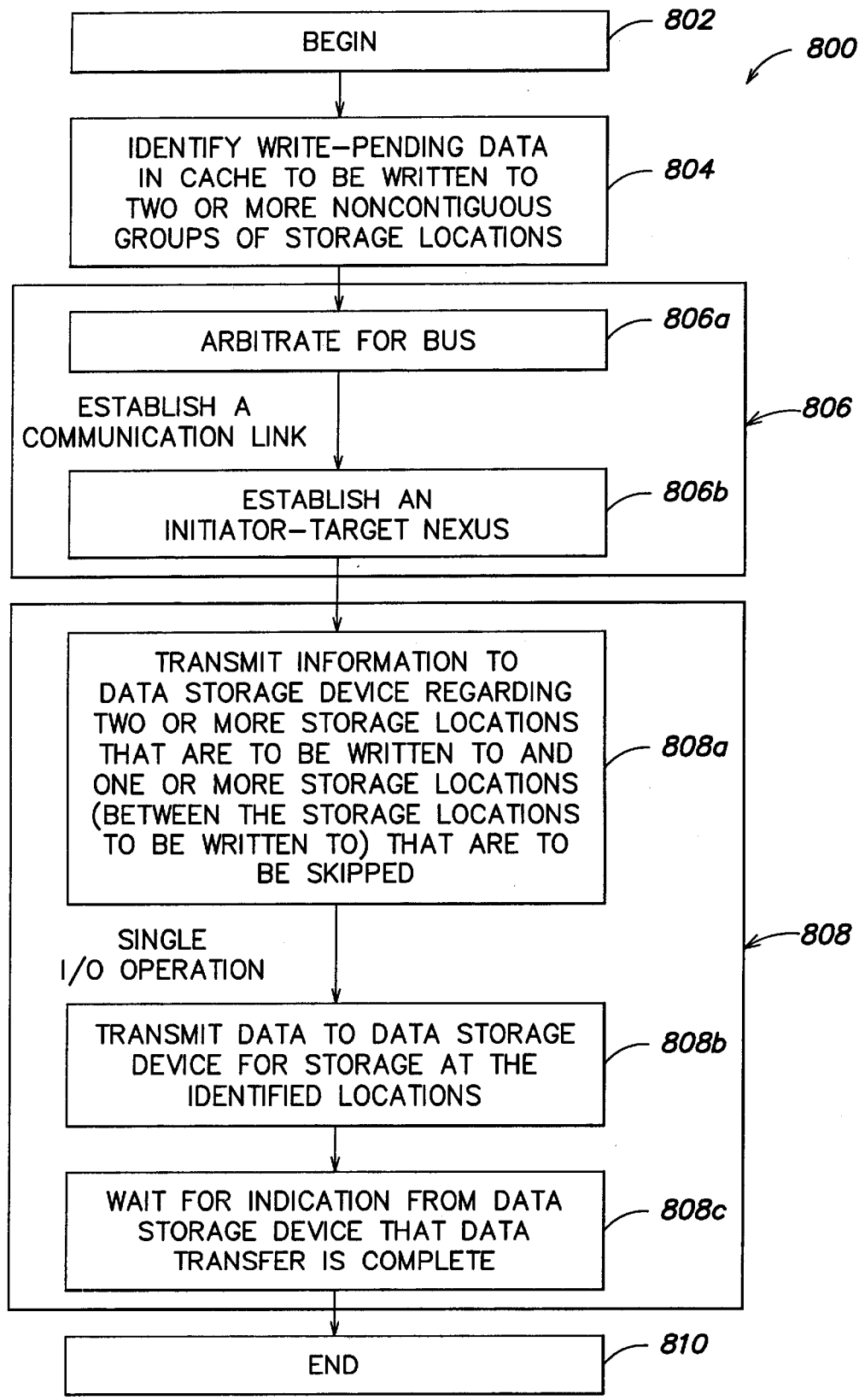
FIG. 8 is a flow diagram illustrating a method for destaging data from a cache to a data storage device according to one embodiment of the present invention.

FIG. 8 shows an example of a method 800 pursuant to which data may be transferred from the cache slots 214 to two or more non-contiguous groups of storage locations (wherein each group includes one or more contiguous storage locations) in a single I/O operation according to one embodiment of the invention. The method 800 can be performed, for example, by one of the disk adapters 208a–b in the system 201 (FIG. 2), but the invention is not limited in this regard. The method 800 can alternatively be performed by a different device in the system 201, or by a device in any other system wherein data is to be destaged from a cache to a data storage device.

After beginning at step 802, the disk adapter 208a (at step 804) may identify write-pending data in the cache slots 214 to be written to two or more non-contiguous groups of contiguous storage locations of one of the disk drives 210a–d, e.g., disk drive 210a. The disk adapter 208a may identify this data in any of numerous ways, and the invention is not limited to any particular method. According to one embodiment, for example, the disk adapter 208a can first scan a group of write-pending flags (e.g., the write-pending flags in the directory 212 (FIG. 6)) for each logical volume serviced by the disk adapter 208a to identify any logical tracks for which there is write-pending data in the cache slots 214, and then can scan the holders $H_{1-N}$ of the cache slots 214 to locate particular records of write-pending data.

When step 804 is complete, the disk adapter 208a (at step 806) may, if necessary, establish a communication link with the disk drive 210a. This communication link may be established in any of numerous ways, and the invention is not limited to any particular method. Steps 806a–b illustrate one example of how a communication link between the disk adapter 208a and the disk drive 210a may be established when a SCSI architecture is used. As shown, in such an embodiment, the disk adapter 208a can establish an initiator-target nexus with the disk drive 210a by: (1) arbitrating for the bus 209a during a SCSI ARBITRATION phase (at step 806a), and (2) connecting to the disk drive 210a during a SCSI CONNECT phase (at step 806b).

Next, when step 806 is complete, the disk adapter 208a may initiate a single I/O operation 808 (e.g., a SCSI I/O process) during which the identified write-pending data can be transferred to the disk drive 210a. In the exemplary method shown, to effect the I/O operation 808, the disk adapter 208a (at step 808a) first transmits information to the disk drive 210a that specifies two or more storage locations to which data is to be written and one or more storage locations (between the storage locations to which data is to be written) which are to be skipped when the data is destaged. This information may be transmitted in any of numerous ways, and the invention is not limited to any particular method. When a SCSI bus architecture is used, for example, the information can be transmitted during a COMMAND phase using a sequence of two commands including the WRITE command and the SKIPMASK command discussed above.

Next, (at step 808b) the disk adapter 208a can transmit the write-pending data to the disk drive 210a via the bus 209a. According to one embodiment, the disk adapter 208a can transmit blocks of data onto the bus 209a in the order that the blocks of data are to be written to the disk drive 210a, as specified by the information transmitted in step 808a.

Finally, (at step 808c) after the disk adapter 208a has transmitted the write-pending data to the disk drive 210a, the disk adapter 208a waits to receive an indication from the disk drive 210a that the transfer of write-pending data is complete. This indication also signifies the end of the I/O operation 808, and the method 800 ends at step 810. When a SCSI architecture is used, for example, a status command may be sent from the disk drive 210a to the disk adapter 208a during a STATUS phase, and the disk drive 210a may subsequently release the bus 209a to begin a BUS FREE phase after the SCSI I/O has completed.

Thus, according to one embodiment of the invention, the disk adapter 208a can destage data from the cache slots 214 to non-contiguous groups of storage locations in the data storage device 210a during a single I/O operation 808. This use of the single I/O operation 808 to perform the destaging provides a performance improvement as compared with the prior art methods described above since: (1) the disk adapter 208a only performs a single search of the write-pending directory 212, (2) the disk adapter 208a only needs to establish a communication channel with the disk drive 210a a single time, and (3) the disk adapter 208a may transfer the data to the non-contiguous groups of storage locations in a single I/O operation.

In the illustrative embodiment discussed above wherein a SCSI bus is employed between the cache and the data storage device (e.g., one of the disk drives 210a–h), the destaging of data from the cache to non-contiguous groups of storage locations of the data storage device can be performed using a single SCSI I/O process. It should be appreciated, however, that when other bus protocols and architectures are employed, aspects of the present invention can still be used to destage data to non-contiguous groups of storage locations in a single I/O operation. The specific characteristics of a single I/O operation may vary slightly depending upon the particular protocol and bus architecture. Examples of the types of characteristics that may define a single I/O operation include the ability of the device that controls the destaging operation (e.g., disk adapter 208a in the illustrative system of FIG. 2) to arbitrate for control of the bus (e.g., the bus 209a) only once while still effecting the transfer of the data to the non-contiguous storage locations of the disk drive (e.g., the disk drive 210a). As a further example, a single I/O operation may involve the return of only a single status command or frame from the storage device indicating that the data was properly received and processed. Again, these are merely examples of the characteristics that may define a single I/O operation in a particular bus protocol and architecture. The present invention is not limited to the use of bus protocols and architectures that would define a single I/O operation using either or both of these characteristics, as the nature of a single I/O operation may be defined differently in different bus protocols.

Having described at least one embodiment of the invention in detail, various modifications and improvements will readily occur to those skilled in the art. Such modifications and improvements are intended to be within the spirit and scope of the invention. Accordingly, the foregoing description is by way of example only, and is not intended to be limiting. The invention is limited only as defined by the following claims and the equivalents thereto.

What is claimed is:

1. A method for destaging data from a cache to at least one data storage device in a data storage system having a controller that controls data flow between the cache and the at least one data storage device, the data storage device having a plurality of tracks, the method comprising a step of:

(a) during a single I/O operation between the controller and the at least one data storage device, destaging data from the cache to at least two non-contiguous storage locations among the plurality of tracks of the at least one data storage device, wherein the at least two storage locations are located on different tracks of the plurality of tracks, and wherein the data is destaged without overwriting at least one storage location disposed between the at least two non-contiguous storage locations.

2. The method as claimed in claim 1, wherein the data storage system includes a SCSI bus coupled between the controller and the at least one data storage device, and wherein the single I/O operation includes a single SCSI I/O process between the controller and the at least one data storage device.

3. The method as claimed in claim 2, wherein both a WRITE command and a SKIPMASK command are transmitted to the at least one data storage device during a COMMAND phase of the SCSI I/O process.

4. The method as claimed in claim 1, wherein the at least one data storage device includes at least one disk drive including a plurality of tracks, and wherein the at least two non-contiguous storage locations are located on different tracks of the at least one disk drive.

5. The method as claimed in claim 1, wherein the at least one data storage device includes at least one disk drive including a plurality of tracks, and wherein the at least two non-contiguous storage locations are located on non-contiguous tracks of the at least one disk drive.

6. The method as claimed in claim 1, wherein the data storage system further includes a bus coupled between the controller and the at least one data storage device, and wherein the step (a) includes a step of:

using the controller to arbitrate successfully for control of the bus only once in connection with the single I/O operation.

7. The method as claimed in claim 1, wherein the step (a) includes a step of:

receiving only a single status indication at the controller from the at least one data storage device in connection with the single I/O operation.

8. The method as claimed in claim 1, wherein the at least one data storage device includes at least one disk drive including a plurality of cylinders, and wherein the method further comprises steps of:

(b) for at least one of the plurality of cylinders in the at least one disk drive, determining whether any write-pending data exists in the cache for the at least one of the plurality of cylinders; and (c) when write-pending data exists in the cache for the at least one of the plurality of cylinders, performing the step (a) to destage all of the write-pending data for the at least one of the plurality of cylinders during the single I/O operation between the data flow controller and the at least one disk drive.

9. The method as claimed in claim 8, wherein the data storage system further includes a SCSI bus coupled between the controller and the at least one data storage device, and wherein the single I/O operation includes a single SCSI I/O process between the data flow controller and the at least one disk drive.

10. The method as claimed in claim 8, wherein the at least one of the plurality of cylinders includes each of the plurality of cylinders.

11. A data storage system, comprising:

a cache;

at least one data storage device having a plurality of tracks; and a data flow controller, coupled between the cache and the at least one data storage device, configured to destage data from the cache to at least two non-contiguous storage locations among the plurality of tracks of the at least one data storage device during a single I/O operation without overwriting at least one storage location disposed between the at least two non-contiguous storage locations, wherein the at least two non-contiguous storage locations are located on different tracks of the plurality of tracks.

12. The data storage system as claimed in claim 11, wherein:

the data storage system further comprises a SCSI bus coupled between the data flow controller and the at least one data storage device; and the data flow controller is configured to destage the data from the cache to the at least two non-contiguous storage locations during a single SCSI I/O process over the SCSI bus.

13. The data storage system as claimed in claim 12, wherein the data flow controller is configured to destage the data by transmitting both a WRITE command and a SKIPMASK command to the at least one data storage device during a COMMAND phase of the single SCSI I/O process.

14. The data storage system as claimed in claim 11, wherein:

the at least one data storage device includes at least one disk drive including a plurality of tracks; and the at least two non-contiguous storage locations are located on different tracks of the at least one disk drive.

15. The data storage system as claimed in claim 11, wherein:

the at least one data storage device includes at least one disk drive including a plurality of tracks; and the at least two non-contiguous storage locations are located on non-contiguous tracks of the at least one disk drive.

16. The data storage system as claimed in claim 11, wherein:

the data storage system further includes a bus coupled between the data flow controller and the at least one data storage device; and the data flow controller is configured to arbitrate successfully for control of the bus only once in connection with the single I/O operation.

17. The data storage system as claimed in claim 11, wherein the data flow controller is configured to receive only a single status indication from the at least one data storage device in connection with the single I/O operation.

18. A data storage system, comprising:

a cache;

at least one data storage device including a plurality of storage locations and having a plurality of tracks;

at least one communication link coupled between the cache and the at least one data storage device; and a data flow controller, coupled between the cache and the at least one data storage device, to destage data from the cache to the at least one data storage device and to transmit information to the at least one data storage device identifying at least two of the plurality of storage locations among the plurality of tracks to which the data is to be written, wherein the at least two storage locations are located on different tracks of the plurality of tracks, and wherein the transmitted information further identifies at least one of the plurality of storage locations disposed between the at least two of the plurality of storage locations to which the data is not to be written.

19. The data storage system as claimed in claim 18, wherein the at least one communication link includes a SCSI bus, and wherein the data flow controller is configured to transmit the information to the at least one data storage device over the SCSI bus during a COMMAND phase of a SCSI I/O process.

20. The data storage system as claimed in claim 18, wherein:

the at least one data storage device includes at least one disk drive including a plurality of tracks; and the at least two storage locations are located on different tracks of the at least one disk drive.

21. The data storage system as claimed in claim 18, wherein:

the at least one storage device includes at least one disk drive including a plurality of tracks; and the at least two storage locations are located on non-contiguous tracks of the at least one disk drive.

* * * * *